United States Patent
Newman (10) Patent No.: US 12,475,405 B2
(45) Date of Patent: Nov. 18, 2025

(54) LOCAL PRE-MATCHING PASS FOR CORRELATED DECODING OF QUANTUM ERROR CORRECTING CODES

(71) Applicant: Google LLC, Mountain View, CA (US)

(72) Inventor: Michael Gabriel Newman, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/750,997

(22) Filed: Jun. 21, 2024

(65) Prior Publication Data
US 2025/0165844 A1 May 22, 2025

Related U.S. Application Data (60) Provisional application No. 63/509,495, filed on Jun. 21, 2023.

(51) Int. Cl.
*H03M 13/00* (2006.01)
*G06N 10/70* (2022.01)

(52) U.S. Cl.
CPC .................................. *G06N 10/70* (2022.01)

(58) Field of Classification Search
None
See application file for complete search history.

(56) References Cited

U.S. PATENT DOCUMENTS

| 11,599,820 | B1* | 3/2023 | Noh ..................... G06N 10/20 |
| 2021/0019223 | A1* | 1/2021 | Chamberland ........ G06N 10/70 |
| 2022/0108262 | A1* | 4/2022 | Cella ..................... G05B 17/02 |
| 2023/0176557 | A1* | 6/2023 | Cella ..................... G05B 13/048 700/117 |

OTHER PUBLICATIONS

Fowler et al., "Optimal complexity correction of correlated errors in the surface code" CoRR, Submitted on Oct. 2013, arXiv:1310.0863v1, 6 pages.

* cited by examiner

*Primary Examiner* — Mujtaba M Chaudry
(74) *Attorney, Agent, or Firm* — Fish & Richardson P.C.

(57) ABSTRACT

Methods, systems, and apparatus for predicting an occurrence of errors in a quantum computation. In one aspect, a method includes updating edge weights of a second quantum error correction detector graph by performing a local search of a first quantum error correction detector graph, wherein performing the local search comprises, for each detection event in the first quantum error correction detector graph, reweighting complementary edges in the second quantum error correction detector graph using single-edge errors on an edge that connects the detection event to a nearest other detection event; and executing a decoding process on the second quantum error correction detector graph to compute a decoding output of the decoding process, wherein the decoding output predicts the occurrence of errors in the quantum computation.

17 Claims, 7 Drawing Sheets

```
┌─────────────────────────────────────────────────────┐
│ Perform local search of a first quantum error correction detector
│ graph to, for each detection event, reweight complementary
│ edges in second quantum error correction graph using single-
│ edge errors on an edge that connects the detection event to a
│ nearest other detection event
│                                                 402
└─────────────────────────────────────────────────────┘
                          │
                          ▼
┌─────────────────────────────────────────────────────┐
│ Execute decoding process on second quantum error correction
│ detector graph to compute decoding output of decoding process
│                                                 404
└─────────────────────────────────────────────────────┘
```

LOCAL PRE-MATCHING PASS FOR CORRELATED DECODING OF QUANTUM ERROR CORRECTING CODES

BACKGROUND

This specification relates to quantum computing.

Quantum computing provides a means to solve certain problems that cannot be solved in a reasonable period of time using conventional classical computers. These problems include factoring very large numbers into their primes and searching large, unstructured data sets. A number of physical systems are being explored for their use in quantum computing, including ions, spins in semiconductors, and superconducting circuits. However, these systems do not perform sufficiently well to serve directly as computational qubits. For example, single two-state physical systems, which can be used as physical qubits, cannot reliably encode and retain information for long enough to be useful, e.g., due to noise.

Quantum error correction is a technology that can enable a quantum computer to reliably execute a quantum algorithm despite noise afflicting its qubits. A decoder is a key component of quantum error correction schemes whose role is to identify errors as they accumulate in the quantum computer. The decoder takes as an input a syndrome, which is measurement data extracted from quantum parity check measurements, and returns as output an estimation of error. Given this estimation, the effect of the error can be reversed. Decoders should be implemented efficiently in order to scale to the regime of practical applications of quantum computing. In particular, they must be accurate in identifying errors, and fast in order to keep up with the quantum computer.

SUMMARY

This specification describes methods, systems and apparatus that implement a local pre-matching pass for correlated decoding of quantum error correcting codes.

One innovative aspect of the subject matter described in this specification can be implemented in a method that includes obtaining measurement data from a quantum computer that performs a quantum computation; generating, using the measurement data, a first detector graph, wherein the first detector graph labels a first set of detection events that occur in the measurement data and each edge in the first detector graph is weighted; generating, using the measurement data, a second detector graph, wherein the second detector graph labels a second set of detection events that occur in the measurement data, the second set of detection events being different to the first set of detection events, and each edge in the second detector graph is weighted; for each detection event in the first detector graph: identifying one or more edges in the first detector graph that are incident to the detection event; and processing the identified one or more edges in sequence, comprising, for each edge that is incident to the detection event and is connected to another detection event, labelling the edge as a candidate error mechanism; and for each edge labelled as a candidate error mechanism, updating respective weights of one or more complementary edges in the second detector graph to generate an updated second detector graph; and executing a decoding process on the updated second detector graph to compute a decoding output of the decoding process, wherein the decoding output predicts an occurrence of errors in the quantum computation.

Other implementations of these aspects includes corresponding computer systems, apparatus, and computer programs recorded on one or more computer storage devices, each configured to perform the actions of the methods. A system of one or more classical computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the first detector graph and the second detector graph are generated from a hypergraph that represents the measurement data.

In some implementations one or more edges in the second detector graph are complementary edges of an edge in the first detector graph when the edge in the first detector graph and the edges in the second detector graph combine into a single hyperedge of the hypergraph.

In some implementations generating the first detector graph and generating the second detector graph comprises: generating a hypergraph that represents the measurement data; and decomposing the hypergraph into the first detector graph and the second detector graph, wherein the first detector graph and the second detector graph are disjoint graphs.

In some implementations updating respective weights of one or more complementary edges in the second detector graph comprises performing Bayesian reweighting of the complementary edges in the second detector graph.

In some implementations the first set of detection events comprise Pauli errors of a first type and the second set of detection events comprise Pauli errors of a second type, wherein the first type is different to the second type.

In some implementations the first type comprises X or Z errors and the second type comprises Z or X errors.

In some implementations the first detector graph and the second detector graph are generated from a hypergraph that represents the measurement data and the hypergraph represents Pauli errors of a third type that are decomposed as Pauli errors of the first type and Pauli errors of the second type.

In some implementations the Pauli errors of the third type comprise Y errors.

In some implementations generating the first detector graph and the second detector graph comprises associating each edge in the first detector graph and each edge in the second detector graph with an equal initial weight.

In some implementations processing the identified one or more edges in sequence comprises processing the identified one or more edges in ascending weight order.

In some implementations processing the identified one or more edges in sequence further comprises, for each edge that is incident to the detection event and is a detector graph boundary edge, processing a subsequent edge of the identified one or more edges.

In some implementations processing the identified one or more edges in sequence further comprises, for each edge that is incident to the detection event and is connected to another node that does not correspond to a detection event, processing a subsequent edge of the identified one or more edges.

In some implementations the decoding process comprises a minimum weight perfect matching decoding process or a union-find decoding process.

In some implementations labelling an edge as a candidate error mechanism indicates that an error associated to the error mechanism has occurred.

Another innovative aspect of the subject matter described in this specification can be implemented in a method for predicting an occurrence of errors in a quantum computation, the method including updating edge weights of a second quantum error correction detector graph by performing a local search of a first quantum error correction detector graph, wherein performing the local search comprises, for each detection event in the first quantum error correction detector graph, reweighting complementary edges in the second quantum error correction detector graph using single-edge errors on an edge that connects the detection event to a nearest other detection event; and executing a decoding process on the second quantum error correction detector graph to compute a decoding output of the decoding process, wherein the decoding output predicts the occurrence of errors in the quantum computation.

In some implementations, implementation of the quantum computation and/or further quantum computations by the quantum computer can be adjusted based on the decoding output that predicts the occurrence of errors in the quantum computation. For example, the quantum computer may be calibrated, configured and/or controlled based on the decoding output.

Other implementations of these aspects includes corresponding computer systems, apparatus, and computer programs recorded on one or more computer storage devices, each configured to perform the actions of the methods. A system of one or more classical computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The subject matter described in this specification can be implemented in particular ways so as to realize one or more of the following advantages.

General decoding of quantum error-correcting codes is a difficult problem. Frequently, e.g., for Calderbank-Shor-Steane (CSS) type codes, different types of errors, e.g., X-type and Z-type errors, are decoded separately to simplify the decoding problem. Separating the decoding problem in this manner can improve decoding efficiency. For example, separating the decoding problem enables the decoding problem to be formulated as a minimum-weight perfect matching problem on weighted graphs.

However, information from one detector graph can increase the likelihood of success on the other. For example, an X-type error on one detector graph implies a higher likelihood of a Z-type error on the other due to a possible Y-type error. This generalizes to error hyper-edges, e.g., Y-type errors, in the error hypergraph that decompose as error edges, e.g., X- or Z-type errors, in the detector graph. Therefore, separating the decoding problem can reduce decoding accuracy and reliability.

The presently described decoding techniques address this problem by incorporating dependencies and correlations between error types to provide a fast heuristic that recoups the accuracy lost when separating the decoding problem. That is, a system implementing the presently described techniques can achieve improved decoding speed and accuracy, e.g., compared to conventional correlated decoding techniques.

Further, it can be difficult for a decoder to meet the high throughput and low latency requirements of real-time decoding whilst maintaining a sufficient level of accuracy. However, since the presently described techniques increase the speed at which decoding is performed, the techniques are more suitable for real-time decoding of quantum error-correcting codes, where the decoder processes a stream of classical bits from the quantum computer and outputs predictions in real-time about a logical state of a quantum algorithm being performed by the quantum computer. In addition, the presently described techniques do not sacrifice decoding accuracy for improved decoding speed and are comparably as accurate as other conventional techniques, e.g., techniques based on multiple passes of minimum weight perfect matching. As such, an accurate understanding of the physical characteristics of the quantum computer can be established without introducing unacceptable delay.

Further, unlike conventional techniques that implement two passes of minimum-weight perfect matching to solve the decoding problem, the presently described techniques enable fast decoding using other graph-based decoders, e.g., correlated union-find decoders that cannot use a minimum-weight perfect matching pre-pass.

Further, the presently described techniques can be efficiently implemented within a streaming decoder that implements functional decomposition. For example, the presently described techniques can be assigned to an independent task thread of multiple task threads responsible for completing the technique prior to a main-pass of the underlying graph-based streaming decoder. Because the technique is local, its solution is independent of future events (instead opting to implement local changes to the graph ahead of the streaming input being processed by the graph-based streaming decoder), and so it minimizes backtracking by the decoder that could compromise latency.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for correlated decoding of a quantum error correcting code. An error hypergraph for the quantum error correcting code is decomposed into multiple detector graphs that represent respective error types. Instead of executing a graph-based decoder separately on each detector graph, an initial pass of the graph-based decoder on one detector graph is replaced with a local search of the detector graph for candidate error mechanisms. The candidate error mechanisms are used to determine adjustments to edge weights of the other detector graph before the graph-based decoder is executed on the other detector graph.

Figure 1:
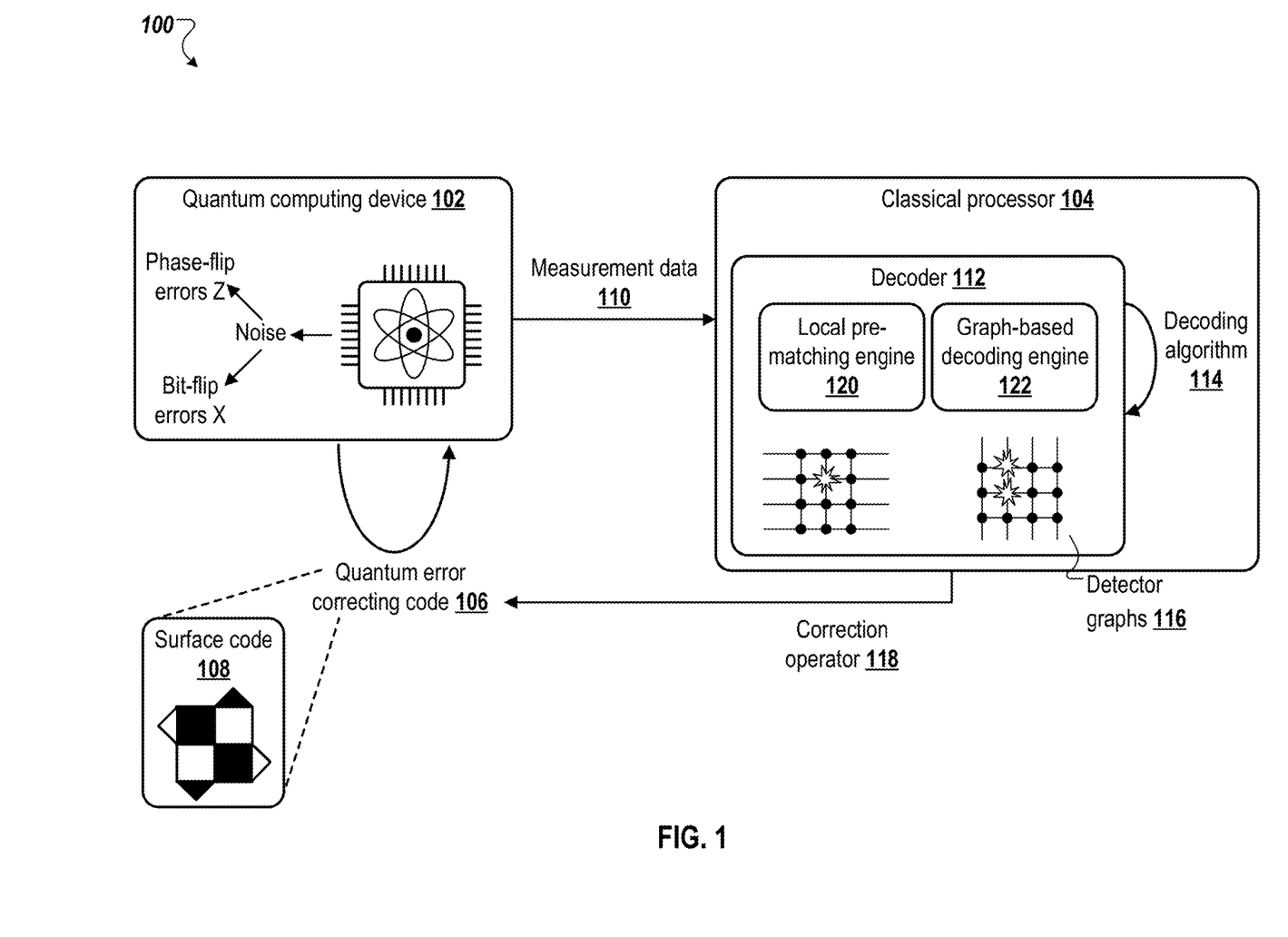
FIG. 1 is a block diagram of an example computing system for correlated decoding of a quantum error correcting code.

FIG. 1 is a block diagram of an example computing system 100 for correlated decoding of a quantum error correcting code. The example computing system 100 is an example of a system implemented as classical and quantum computer programs on one or more classical computers and quantum computing devices in one or more locations, in which the systems, components, and techniques described herein can be implemented.

The example computing system 100 includes a quantum computing device 102 and a classical processor 104. For illustrative purposes, the quantum computing device 102 and classical processor 104 shown in FIG. 1 are illustrated as separate entities, however in some implementations the classical processor 104 may be included in the quantum computing device 102. For example, in some implementations the quantum computing device 102 can be directly connected to the classical processor 104. In other implementations, the quantum computing system 102 can be connected to the classical processor 104 through a network, e.g., a local area network (LAN), wide area network (WAN), the Internet, or a combination thereof.

The quantum computing device 102 includes components for performing quantum computation. For example, the quantum computing device 102 can comprise one or more physical elements, such as qubits, for implementing quantum computations. For example, the quantum computing device can include a quantum data plane that, in turn, includes multiple physical qubits. The quantum computing device 102 can also include a control and measurement plane that is configured to perform operations and measurements on the physical qubits and can also include a control processor plane that is configured to determine sequences of operations and measurements that a quantum algorithm being performed by the quantum computing system requires. The quantum computing device 102 can also include a classical computer that is in data communication with the control processor plane and facilitates user interactions and access to networks or storage. The particular type of the quantum computing device 102 can depend on the type of qubit used. In some implementations the qubits can be superconducting qubits, semiconducting qubits, photonic qubits, or atom-based qubits. For example, the qubits can include Xmon qubits, flux qubits, phase qubits, CAT qubits, or qubits with frequency interactions.

Typically, quantum computations performed by the quantum computing device 102 will be noisy due to the unavoidable presence of errors caused by, e.g., unwanted interactions between qubits, unwanted interactions with the environment (causing decoherence), faulty quantum gates or operations, or errors in the state preparation or measurement process. Example types of errors include coherent errors that act on single qubits, e.g., Pauli X-type errors called bit-flip errors that map the qubit basis states $X|0\rangle=|1\rangle$ and $X|1\rangle=|0\rangle$ and Pauli-Z errors called phase-flip errors that map the qubit basis states $Z|0\rangle=|0\rangle$ and $Z|1\rangle=-|1\rangle$. Noise in a quantum computing device can be represented by an error model, e.g., independent error models as described in more detail below. If left unchecked, errors can destroy quantum information and render quantum computations performed by the quantum computing device 102 useless.

Therefore, the quantum computing device 102 can be configured to execute a quantum error correcting code 106 when performing quantum computations. Quantum error correcting codes encode a first number k of qubits (a Hilbert space of dimension $2^k$) into a second number n of qubits (a Hilbert space of dimension $2^n$), where the second number is larger than the first number, i.e., n>k. The k qubits are data qubits that store logical information and are to be protected from error. The additional n−k qubits are ancilla qubits that are used to detect errors. Example quantum error correcting codes include Stabilizer codes, e.g., Calderbank-Shor-Steane codes or the surface code 108.

The surface code 108 encodes a logical qubit into a patch of multiple physical qubits on a lattice, e.g., a square or hex grid. The lattice includes alternating data qubits and ancilla qubits, where a qubit is placed on each edge of the lattice. The code is defined to be the ground space of the Hamiltonian $H=-\Sigma_{v\in V}X_v-\Sigma_{f\in F}Z_f$ where V represents vertices of the lattice, F represents faces defined by edges connecting vertices of the lattice, the operator $X_v$ is associated with vertex v and is a product of Pauli-X matrices acting on edges incident to v, and the operator $Z_f$ is associated with face f and is a product of Pauli-Z matrices acting on all edges of f. The code space is defined as the simultaneous "+1" eigenstate of the operators $X_v$ and $Z_f$. These operators (or products of these operators) are called the stabilizers of the code. When an error has affected the qubits of the code, any stabilizer that anti-commutes with the error returns a "−1" measurement outcome. A subset of vertices with −1 measurement outcomes is called a syndrome σ. The syndrome σ can be used to determine a correction operator that, when applied to the code, corrects the error up to a stabilizer.

During execution of the quantum error correcting code 106, the quantum computing device 102 is configured to provide measurement data 110 to the classical processor 104. The measurement data 110 can be received as a batch or stream of data. The measurement data 110 includes classical measurement outcome bits, e.g., corresponding to stabilizer measurements. In the present disclosure, a detector is a parity of measurement outcome bits that is deterministic in the absence of errors. The outcome of a detector measurement is 1 if the observed parity differs from the expected parity for a noiseless computation and is 0 otherwise. A Pauli-type error P is said to flip a detector D if including P in the circuit changes the outcome of D, and a detection event is a detector with outcome 1. A logical observable is a linear combination of measurement bits, whose outcome corresponds to the measurement of a logical Pauli operator.

The classical processor 104 includes components for performing classical computations. For example, the classical processor 104 can be implemented as one or more computer programs, i.e., one or more modules of computer program instructions encoded on a tangible non-transitory storage medium for execution by, or to control the operation of, a data processing apparatus. The computer storage medium can be a machine-readable storage device, a machine-readable storage substrate, a random or serial access memory device, or a combination of one or more of them.

The classical processor 104 implements a decoder 112 that is configured to process measurement data 110 received from the quantum computing device 102 to decode the measurement data, i.e., predict which errors may have occurred during the quantum computation performed by the quantum computing device 102. To process the measurement data 110, the decoder 104 is configured to execute a decoding algorithm 114 (also referred to herein as a decoding process) that maps the decoding problem onto a graph problem using a graph-like error model for the quantum error correcting code 106.

A graph-like error model is an independent error model, i.e., a set of m independent error mechanisms, where error mechanism i occurs with probability p[i] (where $p \in R^m$ is a vector of priors) and flips a set of detectors and observables. In a graph-like error model, each error mechanism flips at most two detectors. Graph-like error models can be used to approximate common noise models for many important classes of quantum error correction codes including surface codes, for which X-type and Z-type Pauli errors are both graph-like.

A graph-like error model is represented by a detector graph of nodes and edges G=(V,E), e.g., detector graph 116. Each node $v \in V$ in the detector graph corresponds to a detector. Each edge $e \in E$ is a set of detector nodes of cardinality one or two representing an error mechanism that flips this set of detectors. The set of edges E can be decomposed as $E=E_1 \cup E_2$ where for each edge e in $E_1$, |e|=1 and for each edge e in $E_2$, |e|=2. A regular edge e=(u,v) $\in E_2$ flips a pair of detectors u, v $\in$ V, whereas a half-edge (u,) $\in E_1$ flips a single detector $u \in V$. A half-edge can be connected to a boundary of the detector graph, in which case the edge can be defined as (u, $v_b$) where $v_b$ is a virtual boundary node (which does not correspond to any detector). In some implementations, e.g., when the graph problem is solved using minimum weight perfect matching, each edge can be assigned a weight that is determined by a respective error probability, e.g., w ($e_i$)=log log (1−p[i])/p [i]. Each edge can also be labelled with a set of logical observables that are flipped by the error mechanism, which is denoted either by l($e_i$) or l(u,v) for $e_i$=(u, v) $\in$ E. The distance D(u,v) between two nodes u and v in the detector graph is equal to the length of the shortest path between them.

Example decoding algorithms include minimum weight perfect matching (MWPM) and union find. MWPM decoding processes determine a most probable physical error consistent with syndromes in the measurement data. Detection events in measurement data are identified and labelled in the detector graph. A minimum weight embedded matching of the detection events in the detector graph is then determined, where an embedded matching of a set of detection events is a set of edges in the detector graph where each node corresponding to a detection event in the set of detection events is incident to an odd number of edges in the set of edges and each node that does not correspond to a detection event in the set of detection events is incident to an even number of edges in the set of edges. In conventional implementations of MWPM decoding processes, Edmond's blossom algorithm is used to determine the embedded matching, e.g., by seeding clusters of nodes in the detector graph using the detection events and growing, shrinking, or freezing the clusters until the minimum weight embedded matching is obtained. The embedded matching is used to determine a prediction of which logical observable measurements were flipped, which can in turn be used to determine a correction operator that, when applied to the quantum error correcting code 106, corrects the errors.

Union find decoding processes can be viewed as an approximation of minimum weight perfect matching decoding processes. A union find decoding process identifies detection events in measurement data and seeds clusters of nodes in the detector graph using the detection events. The clusters are then iteratively grown in the detector graph until the parity of the cluster changes. A so-called peeling step is then performed. A spanning tree for each grown cluster is generated and estimations of error are computed by traversing the spanning trees in reverse order. A correction operator that, when applied to the quantum error correcting code 106, corrects the errors is then determined.

In conventional implementations (i.e., that are different to the techniques described in this specification), decoders can simplify the decoding process by implementing separate decoding algorithms to decode different types of errors. For example, a decoder can implement one run of MWPM on a first detector graph to decode X-type errors and another run of MWPM on a second detector graph to decode Z-type errors separately. However, information from one decoding algorithm can increase the likelihood of success on the other. For example, an X-type error on one detector graph implies a higher likelihood of a Z-type error on the other detector graph due to a possible Y-type error. This generalizes to error hyper-edges, e.g., Y-type errors, in an error hypergraph that decompose as error edges, e.g., X- or Z-type errors, in the detector graphs.

To incorporate such correlations between error edges decomposed from an error hyperedge and reduce decoding runtime, e.g., compared to implementing separate MWPM algorithms, the decoder 112 implements a local pre-matching engine 120 and a graph-based decoding engine 122. The local pre-matching engine 120 is configured to match detection events in one detector graph before the graph-based decoding engine 122 executes a decoding algorithm, e.g., MWPM, on another detector graph (hence the term "prematch"). The pre-matching is performed between detection events and their nearest single-edge separated detection events (i.e., using local information, hence the term "local"). The local pre-matching engine 120 uses the local pre-matching of detection events in the first (and second) detector graph to reweight complementary edges in the second (and the first) detector graph. The graph-based decoding engine 122 is then configured to execute a decoding algorithm on the reweighted second (and first) detector graph. Example operations performed by components of the decoder 112 are described in more detail below with reference to FIGS. 2-4.

After the decoder 112 has completed decoding, the classical processor 104 is configured to output a correction operator 118. The correction operator 118 can be applied to the quantum error correcting code 106 to correct the errors identified by the decoder 112.

Figure 2:
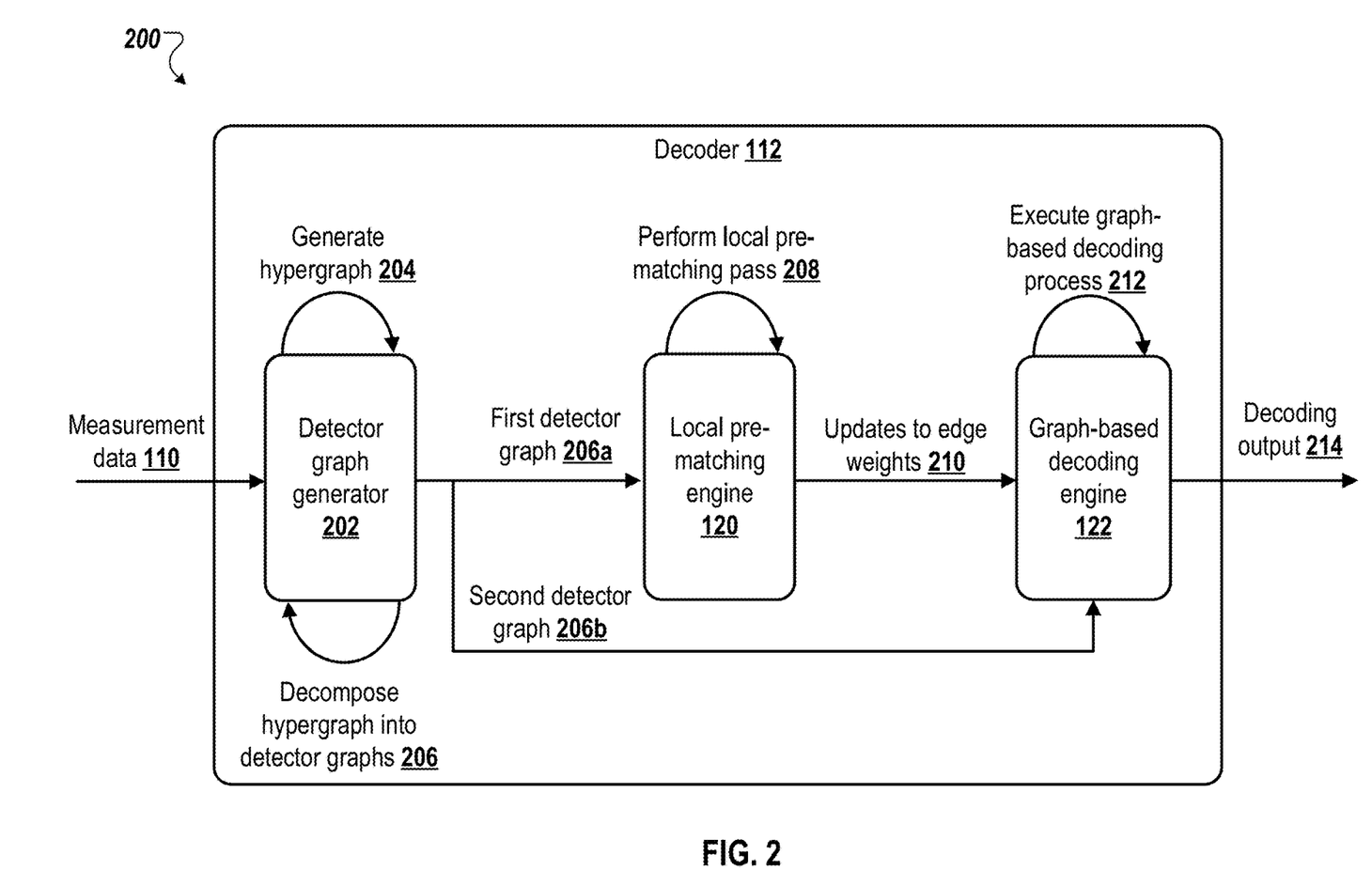
FIG. 2 is a block diagram of an example classical processor decoder.

FIG. 2 is a block diagram 200 of an example classical processor decoder 112. The decoder 112 can be implemented as one or more computer programs, i.e., one or more modules of computer program instructions encoded on a tangible non-transitory storage medium for execution by, or to control the operation of, a data processing apparatus. The computer storage medium can be a machine-readable storage device, a machine-readable storage substrate, a random or serial access memory device, or a combination of one or more of them.

The decoder 112 implements a detector graph generator 202, a local pre-matching engine 120, and a graph-based decoding engine 122. The components of the decoder 112 can be connected via a network, e.g., a local area network (LAN), wide area network (WLAN), the Internet, or a combination thereof, which can be accessed over a wired and/or a wireless communications link.

The detector graph generator 202 is configured to receive measurement data 110 from a quantum computing device 102 and process the measurement data to generate a corresponding hypergraph 204 of nodes and edges. The hypergraph is similar to the detector graph described above with reference to FIG. 1, except that each node in the hypergraph corresponds to a detector that can be flipped by one of multiple error types (and not just one error type) and edges between nodes can join any number of nodes (not just two nodes). In particular, a hyper-graph error model is represented by a hypergraph of nodes and hyperedges G=(V,E). As described above with reference to detector graphs, each node $v \in V$ corresponds to a detector. Each edge $e \in E$ is a set of detector nodes of any cardinality, corresponding to an error mechanism that flips some set of detectors (which can be >2). Each hyperedge has an associated probability corresponding to the probability of the error of the corresponding error mechanism.

The detector graph generator 202 is further configured to decompose the hypergraph 204 into multiple detector graphs 206, where each detector graph corresponds to a respective error mechanism or type. For example, in implementations where the measurement data 110 is obtained through implementation of a Calderbank-Shor-Steane code, the detector graph generator 202 can decompose the hypergraph 204 into a first detector graph 206a that represents Pauli-X type and a second detector graph 206b that represents Pauli-Z type errors. In a general case, the error hypergraph can be decomposed into multiple detector graphs (and the prematch technique can be applied to each of the multiple detector graphs, e.g., simultaneously). The multiple detector graphs each include nodes that correspond to respective detectors and weighted edges between nodes, where the edge weights represent probabilities that the respective types of errors flip the detectors connected by the edges. The initial weights for these edges can be computed as the probabilities of the edges of the error hypergraph, or by combining (as a Bernoulli XOR) the probabilities of the hyperedges that contain that edge in the hypergraph. The multiple detector graphs can have a different underlying structure but have the property that one or more edges in one of the detector graphs are complementary edges of an edge in another detector graph when the edges combine into a single hyperedge of a hypergraph representation of the measurement data. For example, for decoding the surface code, each hyperedge in the error hypergraph can be decomposed as a sum of edges that are already present in the hypergraph, corresponding to the decomposition of Y-type errors into combinations of X-type and Z-type errors.

The detector graph generator 202 is configured to provide data representing the first detector graph 206a of the multiple detector graphs 206 to the local pre-matching engine 120 and to provide data representing the other detector graphs, e.g., the second detector graph 206b, to the graph-based decoding engine 122.

The local pre-matching engine 120 is configured to perform a local pre-matching pass 208 (also referred to herein as a local search) of the first detector graph 206 to identify single-edge errors that connect detection events in the first detector graph 206 to nearest other detection events in the first detection event. The identified single-edge errors are then used to determine updates to edge weights 210 of edges in the other detector graphs, e.g., Bayesian updates.

For example, for each detection event in the first detector graph, the local pre-matching engine 120 can be configured to identify one or more edges in the first detector graph that are incident to the detection event. The local pre-matching engine 120 can then process the identified one or more edges (also referred to as incident edges) in sequence, e.g., in ascending weight order.

In some implementations, an incident edge can be an edge that is a detector graph boundary edge, i.e., an edge that is not connected to another detector. In these implementations, the local pre-matching engine 120 can be configured to terminate processing of the incident edge and process a subsequent incident edge in the sequence. This can improve the performance of the process since boundary edges can typically have a large number of associated error mechanisms which, empirically, do not improve the accuracy of the decoding process. In other implementations, an incident edge can be an edge that is connected to another detector that does not correspond to a detection event. In these implementations, the local pre-matching engine 120 can be configured to terminate processing of the incident edge and process a subsequent incident edge in the sequence.

In other implementations, an incident edge can be an edge that is connected to a detector that corresponds to another detection event. This indicates that one of the errors associated to the error mechanism for the first detector graph has occurred. In these implementations, the local pre-matching engine 120 is configured to label the incident edge as a candidate error mechanism (i.e., a likely error mechanism) and continue processing subsequent incident edges in sequence. Allowing such "overmatching" whereby a detector can have multiple candidate error mechanisms improves the performance of the of the process.

For each edge labelled as a candidate error mechanism, the local pre-matching engine 120 is configured to update respective weights of one or more complementary edges in another detector graph. To update weights of complementary edges in the second detector graph, the local pre-matching engine 120 can be configured to perform Bayesian reweighting. In particular, each error edge (an edge labelled as a candidate error mechanism) is asserted as having occurred. Then, all probabilities of hyperedges in the hypergraph that include the error edge are identified and the normalized probability distribution conditioned on that error edge having occurred is computed. For example, given an X-type error edge of probability p/3 that is present in a single hyperedge, corresponding to e.g., a Y-type hyperedge of probability p/3, then the complementary Z-type edge would be re-weighted. The corresponding probability of the Z-type edge would become 0.5, corresponding to there being an equal probability of an X-type error or a Y-type error having occurred in the conditional probability space.

The local pre-matching engine 120 is configured to provide data representing the determined updates to the edge weights 210 of the other detector graphs, e.g., the second detector graph 206b, to the graph-based decoding engine 122. The graph-based decoding engine 122 is configured to generate updated other detector graphs using the updates to the edge weights 210 and execute a graph-based decoding process 212 on the updated other detector graphs to compute decoding outputs 214 of the decoding process. The decoding output predicts an occurrence of errors in the quantum computation. As described above with reference to FIG. 1, the decoder 112 (or, more generally, classical processor 104)

can be configured to use the prediction to determine a correction operator that, when applied to the quantum error correcting code performed by the quantum computing device, corrects the errors.

Figure 3:
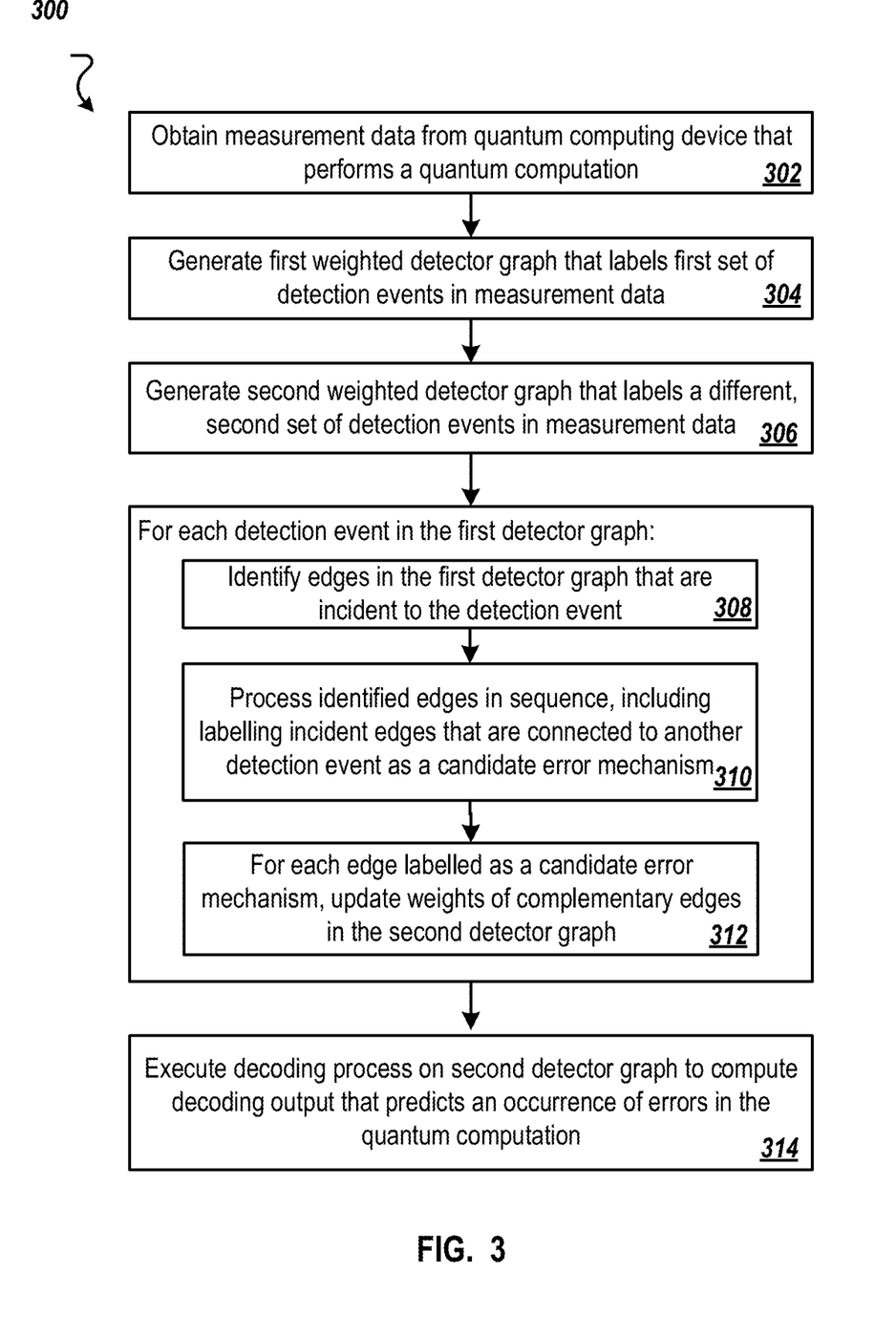
FIG. 3 is a flowchart of an example process for correlated decoding of a quantum error correction code.

FIG. 3 is a flowchart of an example process 300 for correlated decoding of a quantum error correction code. For convenience, the process 300 will be described as being performed by components of a classical computing system. For example, a classical decoder, e.g., decoder 112 of FIGS. 1 and 2, appropriately programmed, can perform example process 300.

The system obtains measurement data from a quantum computing device that performs a quantum computation using a quantum error correction code (step 302).

The system uses the measurement data to generate a first detector graph (step 304). The first detector graph is a graph of nodes and edges, where each node corresponds to a detector in the measurement data and each edge is a set of nodes of cardinality one or two representing a respective error mechanism that flips the set of detectors. The edges in the first detector graph are weighted edges, e.g., where the edge weights depend on a probability that represents an error probability under a first error model of noise in the quantum computing device. The first detector graph labels a first set of detection events that occur in the measurement data. The first set of detection events correspond to a first type of errors, e.g., Pauli X errors or Pauli Z errors.

The system also uses the measurement data to generate a second detector graph (step 306). The second detector graph is also a graph of nodes and edges, where each node corresponds to a detector in the measurement data and each edge is a set of nodes of cardinality one or two representing a respective error mechanism that flips the set of detectors. The edges in the second detector graph are also weighted edges, e.g., where the edge weights depend on a probability that represents an error probability under a second error model of noise in the quantum computing device. The second detector graph labels a second set of detection events that occur in the measurement data. The second set of detection events correspond to a second type of errors that are different from the first type of errors. For example, if the first set of detection events includes Pauli X errors (or Pauli Z errors), then the second set of detection events can include Pauli Z errors (or Pauli X errors).

The first detector graph and the second detector graph can be generated from a hypergraph that represents the measurement data. For example, at step 302, the system can generate a hypergraph that represents the measurement data. The hypergraph can represent errors of different types, e.g., Pauli X errors, Pauli Z errors, and Pauli Y errors (which can be decomposed as Pauli X errors or Pauli Z errors). The system can then decompose the hypergraph into a first detector graph for decoding a first type of errors and a second detector graph for decoding a second type of errors, where the first detector graph and the second detector graph are disjoint graphs.

For each detection event in the first detector graph, the system identifies one or more edges in the first detector graph that are incident to the detection event (step 308). The system then processes the identified one or more edges (also referred to as incident edges) in sequence (step 310). For example, the system can process the incident edges in ascending weight order, representative of choosing the most likely error edge.

The system can determine whether each incident edge is a detector graph boundary edge, an edge that is connected to another detector that does not correspond to a detection event, or an edge that is connected to a detector that corresponds to another detection event. In response to determining that an incident edge is a detector graph boundary edge, the system can terminate processing of the incident edge and process a subsequent incident edge in the sequence. In response to determining that an incident edge is an edge that is connected to another detector that does not correspond to a detection event, the system can terminate processing of the incident edge and process a subsequent incident edge in the sequence. In response to determining that an incident edge is an edge that is connected to a detector that corresponds to another detection event, the system can label the incident edge as a candidate error mechanism and terminate the search around the detection event.

Then, for each edge labelled as a candidate error mechanism, the system updates respective weights of one or more complementary edges in the second detector graph to generate an updated second detector graph (step 312). One or more edges in the second detector graph are complementary edges of an edge in the first detector graph when the edge in the first detector graph and the edges in the second detector graph combine into a single hyperedge of a hypergraph representation of the measurement data. To update weights of complementary edges in the second detector graph, the system can perform Bayesian reweighting. In particular, each error edge is asserted as having occurred. Then, over all probabilities of hyperedges that include the error edge are identified and the normalized probability distribution conditioned on that error edge having occurred is computed. The weight is then computed, e.g., as $-\ln(p/(1-p))$ for each new probability p.

The system executes a graph-based decoding process on the updated second detector graph to compute a decoding output of the decoding process (step 314). In some implementations the decoding process can be a minimum weight perfect matching decoding process or a union-find decoding process. The decoding output predicts an occurrence of errors in the quantum computation. The system can use the predicted occurrence of errors to determine a correction operator that, when applied to the quantum computing system, corrects the errors.

Steps 308-314 of example process 300 can also be performed (e.g., simultaneously) on the second detector graph to update weights of complementary edges in the first detector graph and generate an updated first detector graph that can be decoded at step 314. More generally, the system can generate multiple (e.g., more than two) detector graphs at steps 304 and 306. Steps 308-314 can then be performed, e.g., in parallel, on each of the multiple detector graphs.

Figure 4:
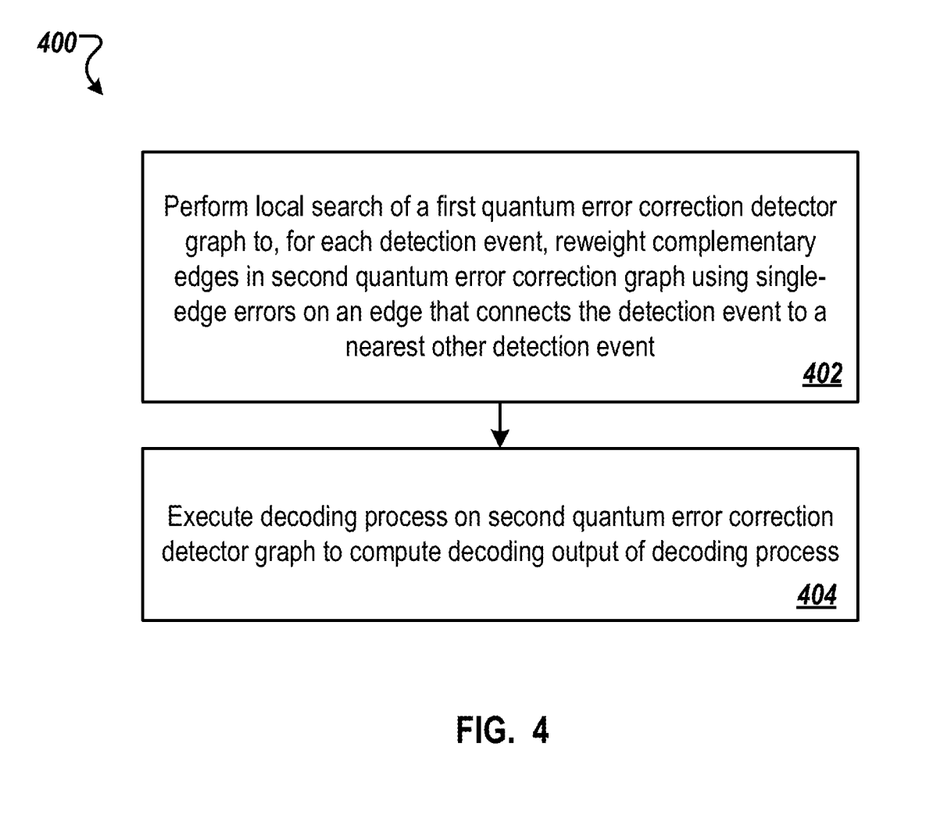
FIG. 4 is a flowchart of an example process for predicting an occurrence of errors in a quantum computation.

FIG. 4 is a flowchart of an example process 400 for predicting an occurrence of errors in a quantum computation. For convenience, the process 400 will be described as being performed by components of a classical computing system. For example, a classical decoder, e.g., decoder 112 of FIGS. 1 and 2, appropriately programmed, can perform example process 400. Example process 400 can be implemented in conjunction with the definitions and operations described herein, e.g., the definitions and operations described above with reference to example process 300 of FIG. 3.

The system updates edge weights of a second quantum error correction detector graph by performing a local search of a first quantum error correction detector graph (step 402). To perform the local search, for each detection event in the first quantum error correction detector graph, the system reweights complementary edges in the second quantum error correction detector graph using single-edge errors on an edge that connects the detection event to a nearest other detection event (where distances between detection events are measured according to edge weights connecting the detection events, e.g., a first pair of detection events are closer/nearer to each other than a second pair of detection events if an edge that connects the first pair has a larger weight than an edge that connects the second pair).

The system executes a decoding process on the second quantum error correction detector graph (with the reweighted edges) to compute a decoding output of the decoding process (step 404). The decoding output predicts the occurrence of errors in the quantum computation. The system can use the predicted occurrence of errors to determine a correction operator that, when applied to the quantum computing system, corrects the errors.

Figure 5:
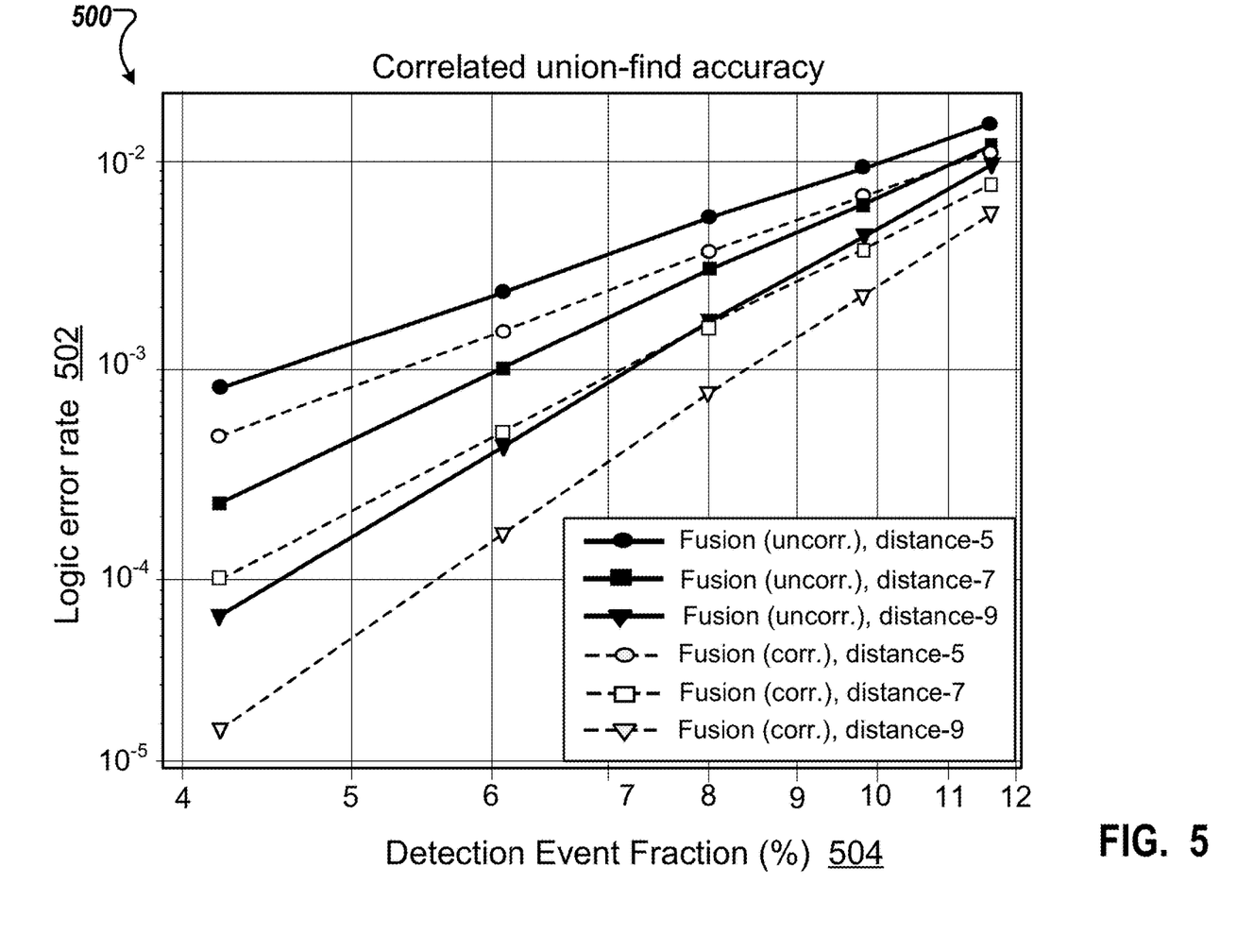
FIG. 5 is a graph that compares the logical error rates of union-find decoders that implement local pre-matched correlated decoding to union-find decoders that implement uncorrelated decoding.

FIG. 5 is a graph 500 that compares the logical error rates of union-find decoders that implement local pre-matched correlated decoding to union-find decoders that implement uncorrelated decoding (without a local pre-matching pass where Y-type errors are treated as totally independent X and Z type errors). The logical error rate 502 is plotted in graph 500 as a function of detection event fraction percentage 504. Six implementations of the union-find decoder are plotted— an uncorrelated union-find decoder with code distance 5, an uncorrelated union-find decoder with code distance 7, an uncorrelated union-find decoder with code distance 9, a local pre-matched correlated union-find decoder with code distance 5, a local pre-matched correlated union-find decoder with code distance 7, and a local pre-matched correlated union-find decoder with code distance 9.

As shown, for each fixed code distance, a union-find decoder achieves lower logical error rates when implementing the presently described local pre-matched correlated decoding techniques compared to implementing uncorrelated decoding techniques. Furthermore, the presently described techniques achieve a higher error suppression factor at a fixed error rate for increasing distance, so that the gap between the two decoders increases with distance.

Figure 6:
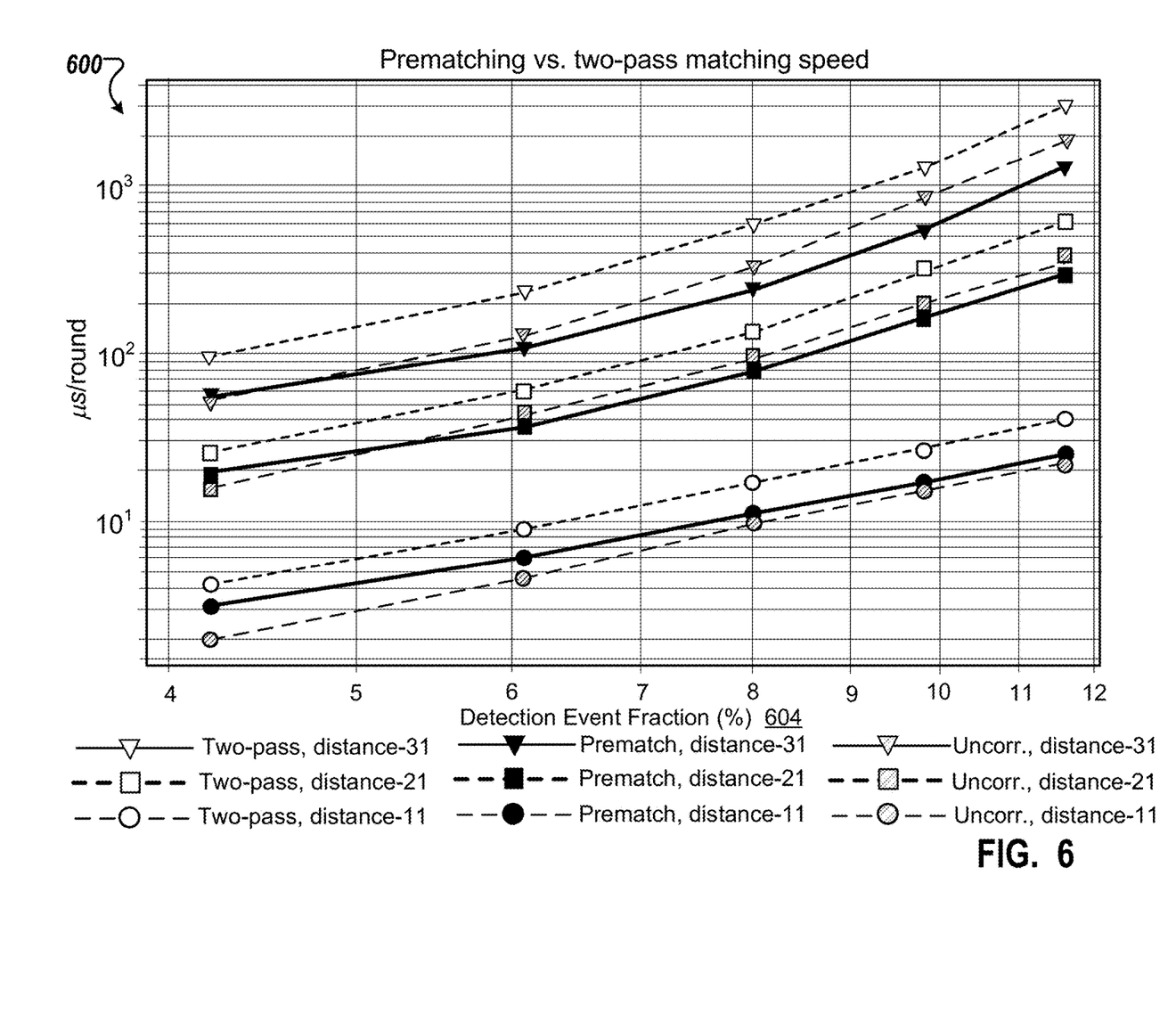
FIG. 6 is a graph that compares the decoding speed of decoders that implement two-pass minimum weight perfect matching correlated decoding, decoders that implement local pre-matched correlated decoding, and decoders that implement uncorrelated decoding.

FIG. 6 is a graph 600 that compares the decoding speed of decoders that implement two-pass minimum weight perfect matching correlated decoding ("two-pass"), decoders that implement local pre-matched correlated decoding ("pre-match"), and decoders that implement uncorrelated decoding ("Uncorr."). The decoding speed (in us per round of decoding) 602 is plotted in graph 600 as a function of detection event fraction percentage 604. Each of the three different decoding implementations are plotted for code distances equal to 11, 21, and 31.

As shown, for larger code distances (e.g., code distances 21 and 31) and detection event fractions larger than 6%, the decoding speed is faster when implementing the presently described local pre-matched correlated decoding techniques compared to two-pass minimum weight perfect matching correlated decoding and uncorrelated decoding techniques. That the pre-match technique can run faster than the uncorrelated technique provides evidence that the technology can be used to improve speed in addition to accuracy. This applies to, e.g., graph-based decoders whose runtime depends on a local graph search that can execute more quickly with the improved graph weights. Furthermore, the presently described decoding technique runs significantly faster than two-pass decoding in all parameter regimes, while being similar in accuracy (see FIG. 7).

Figure 7:
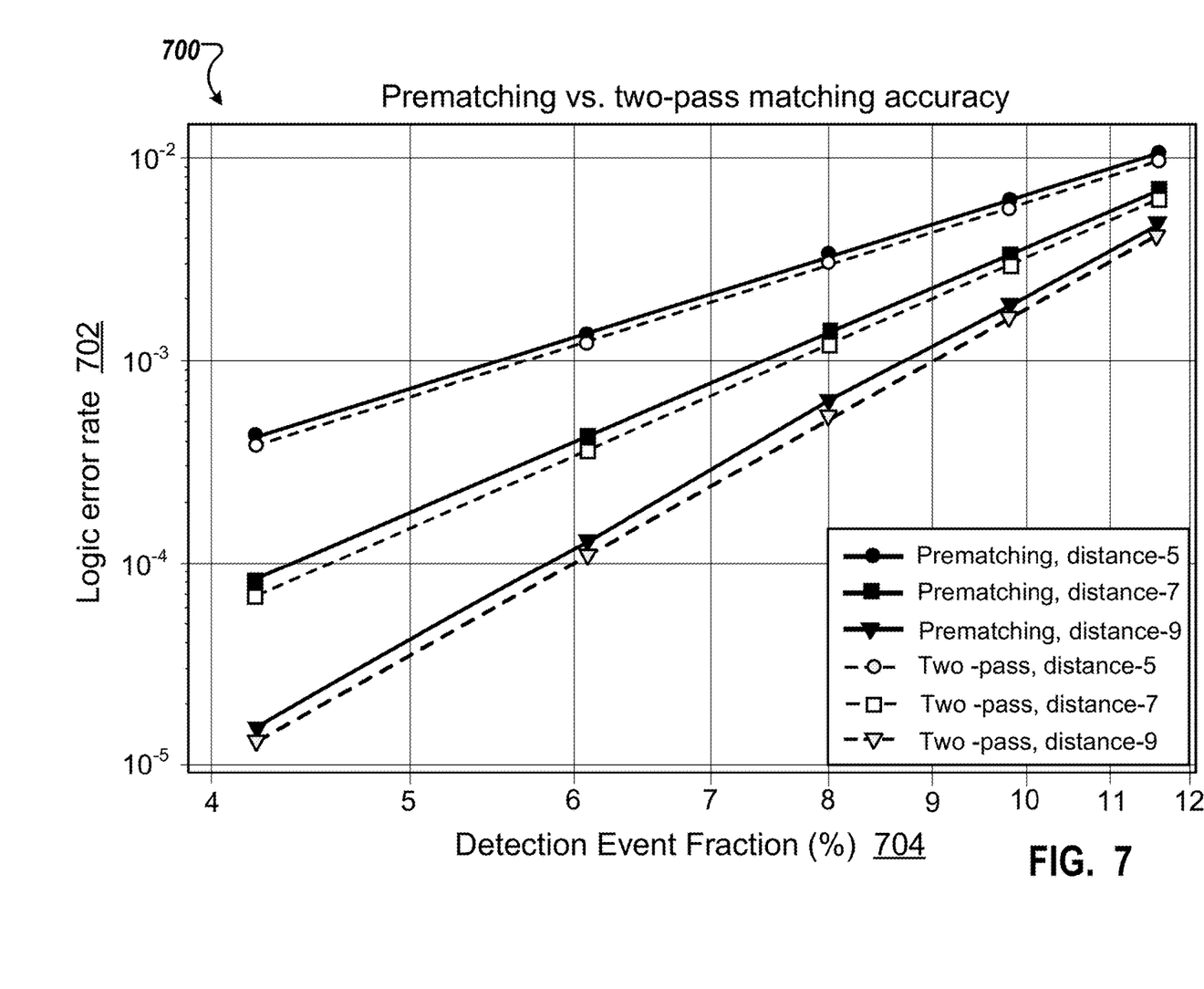
FIG. 7 is a graph that compares the logical error rates of decoders that implement two-pass minimum weight perfect matching correlated decoding and decoders that implement local pre-matched correlated decoding.

FIG. 7 is a graph 700 that compares the logical error rates of decoders that implement two-pass minimum weight perfect matching correlated decoding and decoders that implement local pre-matched correlated decoding. The logical error rates 702 are plotted in graph 700 as a function of detection event fraction percentage 704. Each of the decoding implementations are plotted for code distances equal to 5, 7, and 9.

As shown, the accuracy (measured in terms of the logical error rate) of the presently described local pre-matched correlated decoding is similar to the accuracy of full two-pass minimum weight perfect matching correlated decoding, while being faster in all tested parameter regimes (see FIG. 6).

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer implemented method comprising:
   obtaining measurement data from a quantum computer that performs a quantum computation;
   generating, using the measurement data, a first detector graph, wherein the first detector graph labels a first set of detection events that occur in the measurement data and each edge in the first detector graph is weighted;
   generating, using the measurement data, a second detector graph, wherein the second detector graph labels a second set of detection events that occur in the measurement data, the second set of detection events being different to the first set of detection events, and each edge in the second detector graph is weighted;
   for each detection event in the first detector graph:
      identifying one or more edges in the first detector graph that are incident to the detection event; and
      processing the identified one or more edges in sequence, comprising, for each edge that is incident to the detection event and is connected to another detection event, labelling the edge as a candidate error mechanism; and
   for each edge labelled as a candidate error mechanism, updating respective weights of one or more complementary edges in the second detector graph to generate an updated second detector graph; and
   executing a decoding process on the updated second detector graph to compute a decoding output of the decoding process, wherein the decoding output predicts an occurrence of errors in the quantum computation.

2. The method of claim 1, wherein the first detector graph and the second detector graph are generated from a hypergraph that represents the measurement data.

3. The method of claim 2, wherein one or more edges in the second detector graph are complementary edges of an edge in the first detector graph when the edge in the first detector graph and the edges in the second detector graph combine into a single hyperedge of the hypergraph.

4. The method of claim 1, wherein generating the first detector graph and generating the second detector graph comprises:
generating a hypergraph that represents the measurement data; and
decomposing the hypergraph into the first detector graph and the second detector graph, wherein the first detector graph and the second detector graph are disjoint graphs.

5. The method of claim 1, wherein updating respective weights of one or more complementary edges in the second detector graph comprises performing Bayesian reweighting of the complementary edges in the second detector graph.

6. The method of claim 1, wherein the first set of detection events comprise Pauli errors of a first type and the second set of detection events comprise Pauli errors of a second type, wherein the first type is different to the second type.

7. The method of claim 6, wherein the first type comprises X or Z errors and the second type comprises Z or X errors.

8. The method of claim 6, wherein the first detector graph and the second detector graph are generated from a hypergraph that represents the measurement data and the hypergraph represents Pauli errors of a third type that are decomposed as Pauli errors of the first type and Pauli errors of the second type.

9. The method of claim 8, wherein the Pauli errors of the third type comprise Y errors.

10. The method of claim 1, wherein generating the first detector graph and the second detector graph comprises associating each edge in the first detector graph and each edge in the second detector graph with an equal initial weight.

11. The method of claim 1, wherein processing the identified one or more edges in sequence comprises processing the identified one or more edges in ascending weight order.

12. The method of claim 1, wherein processing the identified one or more edges in sequence further comprises, for each edge that is incident to the detection event and is a detector graph boundary edge, processing a subsequent edge of the identified one or more edges.

13. The method of claim 1, wherein processing the identified one or more edges in sequence further comprises, for each edge that is incident to the detection event and is connected to another node that does not correspond to a detection event, processing a subsequent edge of the identified one or more edges.

14. The method of claim 1, wherein the decoding process comprises a minimum weight perfect matching decoding process or a union-find decoding process.

15. The method of claim 1, wherein labelling an edge as a candidate error mechanism indicates that an error associated to the error mechanism has occurred.

16. A system comprising:
one or more data processing apparatuses; and
non-transitory computer readable storage media in data communication with the one or more data processing apparatuses and storing instructions that, when executed by the data processing apparatuses, cause the one or more data processing apparatuses to perform operations for decoding measurement data received from a quantum computer that performs a quantum computation, the operations comprising:
obtaining measurement data from a quantum computer that performs a quantum computation;
generating, using the measurement data, a first detector graph, wherein the first detector graph labels a first set of detection events that occur in the measurement data and each edge in the first detector graph is weighted;
generating, using the measurement data, a second detector graph, wherein the second detector graph labels a second set of detection events that occur in the measurement data, the second set of detection events being different to the first set of detection events, and each edge in the second detector graph is weighted;
for each detection event in the first detector graph:
identifying one or more edges in the first detector graph that are incident to the detection event; and
processing the identified one or more edges in sequence, comprising, for each edge that is incident to the detection event and is connected to another detection event, labelling the edge as a candidate error mechanism; and
for each edge labelled as a candidate error mechanism, updating respective weights of one or more complementary edges in the second detector graph to generate an updated second detector graph; and
executing a decoding process on the updated second detector graph to compute a decoding output of the decoding process, wherein the decoding output predicts an occurrence of errors in the quantum computation.

17. A computer-readable storage medium comprising instructions stored thereon that are executable by a processing device and upon such execution cause the processing device to perform operations for decoding measurement data received from a quantum computer that performs a quantum computation, the operations comprising:
obtaining measurement data from a quantum computer that performs a quantum computation;
generating, using the measurement data, a first detector graph, wherein the first detector graph labels a first set of detection events that occur in the measurement data and each edge in the first detector graph is weighted;
generating, using the measurement data, a second detector graph, wherein the second detector graph labels a second set of detection events that occur in the measurement data, the second set of detection events being different to the first set of detection events, and each edge in the second detector graph is weighted;
for each detection event in the first detector graph:
identifying one or more edges in the first detector graph that are incident to the detection event; and
processing the identified one or more edges in sequence, comprising, for each edge that is incident to the detection event and is connected to another detection event, labelling the edge as a candidate error mechanism; and
for each edge labelled as a candidate error mechanism, updating respective weights of one or more complementary edges in the second detector graph to generate an updated second detector graph; and
executing a decoding process on the updated second detector graph to compute a decoding output of the decoding process, wherein the decoding output predicts an occurrence of errors in the quantum computation.

\* \* \* \* \*